US007833648B2

(12) United States Patent
Park et al.

(10) Patent No.: US 7,833,648 B2
(45) Date of Patent: Nov. 16, 2010

(54) ELECTROCHEMICAL DEVICE WITH HIGH SAFETY AT OVER-VOLTAGE AND HIGH TEMPERATURE

(75) Inventors: Young Sun Park, Daejeon (KR); Myoung Hun Lee, Seoul (KR); Pil Kyu Park, Daejeon (KR); Eun Ju Kang, Daejeon (KR); Gi Cheul Kim, Daejeon (KR)

(73) Assignee: LG Chem, Ltd. (KR)

( * ) Notice: Subject to any disclaimer, the term of this patent is extended or adjusted under 35 U.S.C. 154(b) by 628 days.

(21) Appl. No.: 11/829,226

(22) Filed: Jul. 27, 2007

(65) Prior Publication Data
US 2008/0026283 A1 Jan. 31, 2008

(30) Foreign Application Priority Data
Jul. 27, 2006 (KR) ............... 10-2006-0071058
Oct. 2, 2006 (KR) ............... 10-2006-0097138

(51) Int. Cl.
H01M 10/42 (2006.01)
(52) U.S. Cl. ....................................... 429/62; 428/407
(58) Field of Classification Search .............. 429/60, 429/61, 62; 428/407
See application file for complete search history.

(56) References Cited

U.S. PATENT DOCUMENTS 5,965,264 A * 10/1999 Barenberg et al. ...... 428/407 X

2005/0069759 A1 * 3/2005 Shimamura et al. ........ 429/61 X
2006/0063066 A1 * 3/2006 Choi et al. ................ 429/62 X

FOREIGN PATENT DOCUMENTS

| JP | 06150975 A | 5/1994 |
| JP | 09045371 A | 2/1997 |
| JP | 11317232 A | 11/1999 |
| JP | 2002319436 A | 10/2002 |
| JP | 2002373706 A | 12/2002 |
| JP | 2005011540 A | 1/2005 |
| JP | 2006286624 A | 10/2006 |
| KR | 1019980064748 A | 10/1998 |
| KR | 1020030075889 B1 | 9/2003 |
| KR | 1020060035885 A | 4/2006 |
| KR | 1020060060188 A | 6/2006 |

* cited by examiner

Primary Examiner—Stephen J. Kalafut
(74) Attorney, Agent, or Firm—Cantor Colburn LLP

(57) ABSTRACT

Disclosed is an electrochemical device including a gas discharge member disposed in inner volumes thereof or used as an element for forming the device, wherein the gas discharge member comprises: (a) a core portion containing a compound that discharges gases other than oxygen at a predetermined temperature range; and (b) a polymeric shell portion for encapsulating the compound and surrounding the core portion. A center pin for an electrochemical device having the gas discharge member inserted into the interstitial volumes of the device is also disclosed. The electrochemical device comprising the gas discharge member, which discharges a large amount of gas at a predetermined temperature and is inserted into the inner volumes of the device, is prevented from ignition or explosion under overcharge and high-temperature storage conditions with no drop in the performance.

18 Claims, 9 Drawing Sheets

(a)

(b)

(a)

(b)

(a)

(b)

ELECTROCHEMICAL DEVICE WITH HIGH SAFETY AT OVER-VOLTAGE AND HIGH TEMPERATURE

This application claims the benefit of Korean Patent Application Nos. 10-2006-71058 and 10-2006-97138, filed Jul. 27, 2006 and Oct. 2, 2006, respectively in Korea, which are hereby incorporated by reference in their entirety for all purposes as if fully set forth herein

TECHNICAL FIELD

The present invention relates to an electrochemical device that prevents explosion and/or ignition even when its internal temperature abnormally increases due to external or internal factors, and thus ensures excellent safety.

BACKGROUND ART

In general, when a lithium secondary battery using an inflammable non-aqueous electrolyte is overcharged, an excessive amount of lithium is deintercalated from a cathode and the lithium is intercalated into an anode, resulting in the precipitation of lithium metal with high reactivity on the surface of the anode. Also, the cathode becomes thermally unstable, and an organic solvent used as an electrolyte is decomposed to cause a rapid exothermic reaction, resulting in ignition and explosion of the battery.

Additionally, polyethylene used as a separator between a cathode and an anode starts to melt at a temperature of 120~130° C. as the battery temperature increases. Such shrinking of the separator causes the anode and the cathode to be in contact with each other at the edges thereof, resulting in the generation of an internal short. Thus, a local overcurrent phenomenon occurs in the battery, and such overcurrent causes rapid heat emission and an increase in the temperature of the battery. As a result, ignition of the battery occurs.

To solve the above-mentioned problem, Japanese Laid-Open Patent No. 1994-150975 discloses a method of filling an electrolyte into a battery under pressure by using carbon dioxide, so that the electrolyte is easily discharged to the exterior together with carbon dioxide when the battery temperature abnormally increases. However, when the electrolyte is incorporated into the pores present inside a separator or into an electrode, the electrolyte cannot be discharged to the exterior merely by the gas pressure. Therefore, the problem of ignition of a battery caused by the decomposition of an electrolyte is still not solved.

Additionally, Japanese Laid-Open Patent No. 1999-317232 discloses a method for imparting flame resistance to an electrolyte for a lithium secondary battery by introducing a phosphate-based flame retardant, such as trialkyl phosphates, trimethyl phosphate or dimethyl phosphate, into the electrolyte. Such phosphate-based flame retardants are molten by the heat generated upon the ignition of a battery, and surround the surface of an electrode so as to prevent the electrode from being in contact with oxygen, and to serve as a fire extinguishing agent. Therefore, it is necessary to introduce a great amount of flame retardants into the electrolyte, and the use of such a great amount of phosphate-based flame retardants causes degradation of the quality of the battery. Additionally, because an electrolyte with high inflammability causes rapid propagation of fire as soon as it is ignited, the phosphate-based flame retardant alone is insufficient to accomplish fire extinguishment in the battery.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Therefore, the present invention has been made in view of the above-mentioned problems. The inventors of the present invention have studied developing a method for improving the safety of an electrochemical device by introducing a compound that discharges a great amount of gas other than inflammable gases, such as oxygen, into the inner volumes of the electrochemical device. However, the inventors of the present invention have observed that the gas discharge compound is partially consumed via a reaction in the normal drive range of the device, and thus it cannot perform its unique function sufficiently, even when the function is required, resulting in degradation of the safety and the quality of the device.

Therefore, it is an object of the present invention to provide a method for improving the safety of an electrochemical device by using a gas discharge member with a core-shell structure formed of the above-mentioned gas discharge compound surrounded with a polymer component that is electrochemically stable in the drive range of the device.

In order to achieve the above-mentioned object, there is provided an electrochemical device, and preferably a lithium secondary battery, including a gas discharge member disposed in inner volumes of the device or used as an element for forming the device, the gas discharge member comprising:

(a) a core portion containing a compound that discharges gases other than oxygen at a predetermined temperature range; and (b) a polymeric shell portion for encapsulating the compound and surrounding the core portion.

Also, there is provided a center pin for an electrochemical device, which is inserted into a mandrel of a wound electrode-separator assembly received in a casing for the assembly, and includes a gas discharge member comprising: (a) a core portion containing a compound that discharges gases other than oxygen at a predetermined temperature range; and (b) a polymeric shell portion for encapsulating the compound and surrounding the core portion, the gas discharge member being inserted into inner volumes of the device.

Hereinafter, the present invention will be explained in more detail.

The present invention is characterized by introducing a compound capable of discharging a great amount of gas other than oxygen at a predetermined temperature range into inner volumes of an electrochemical device, the gas discharge compound being introduced in the form of a gas discharge member with a core-shell structure in which the compound is surrounded with an electrochemically stable polymer.

In the gas discharge member according to the present invention, the core portion containing the gas discharge compound is surrounded with the polymeric shell portion.

Figure 1:
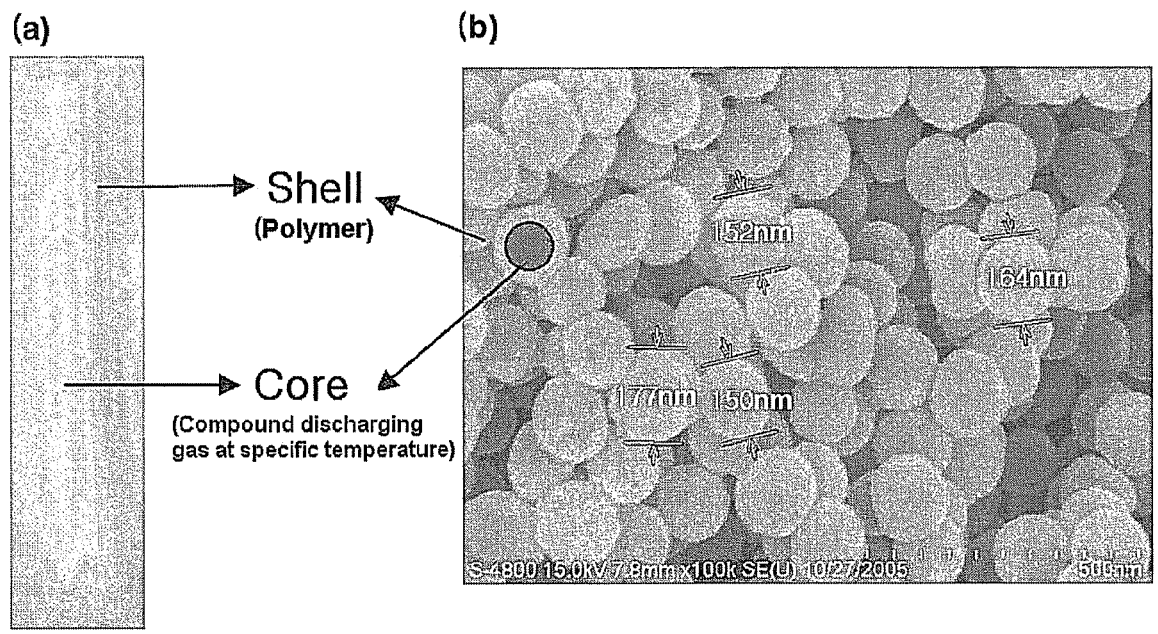
FIG. 1 is a schematic view showing the gas discharge member with a core-shell structure according to a preferred embodiment of the present invention.

The polymer shows higher electrochemical stability as compared to a general low-molecular weight compound having an unreacted group because the chemically reactive groups in the polymer have already been reacted to form the polymer. FIG. 1 shows the electrochemical stability of a polystyrene polymer used as a shell material according to the present invention. As can be seen from FIG. 1, polystyrene is stable in the drive voltage range of a lithium secondary battery. Therefore, unlike a low-molecular weight compound that is introduced into an electrochemical device, is partially consumed in the normal drive range of an electrochemical device and shows an insufficient effect of improving the safety of the device, such shell materials exist stably in the normal drive range of the device with no loss of a gas discharge compound.

In other words, the gas discharge member exists in the inner volumes of the device while maintaining adhesion thereto in the normal drive temperature range of the device with no loss of a core material, and thus it does not adversely affect the electrochemical reactions in the device. When the temperature of the device abnormally increases due to external or internal factors including overcharge or high-temperature storage conditions, the gas discharge member undergoes a collapse of its core-shell structure to cause a great amount of gas or the gas discharge compound to be discharged to the exterior of the polymeric shell. Such a great amount of gas other than oxygen can prevent any inflammable constitutional element forming the device from being in contact with oxygen as a firing factor, and thus can inhibit ignition and explosion of the device.

Additionally, the gas discharge member allows free control of the amount of the gas discharge compound contained in the polymeric shell, and thus can be used in combination with safety devices with various operating pressure ranges.

<Gas Discharge Member>

The shell portion forming the gas discharge member according to the present invention has electrochemically stable properties in the normal drive range of an electrochemical device, and includes a polymer capable of surrounding the whole surface of a core uniformly. Such polymers also have excellent adhesion so as to be continuously bound to the interstitial volumes of the device.

Additionally, the shell that may be used in the present invention includes a material non-reactive to an electrolyte. When the shell is reactive to an electrolyte, it may cause a side reaction with the electrolyte and may undergo a structural collapse, even under a normal condition, thereby discharging the core material.

Particularly, the shell portion should allow a gas discharge material (i.e. core material) or gas generated from the gas discharge material to be discharged to the exterior when the internal temperature of the device abnormally increases. In view of this, selection of the material for the shell polymer is very important.

For example, when the polymeric shell is formed of a polymer that is hardly molten after being solidified via a chemical reaction, it shows good electrochemical stability, but does not allow the core material and/or gas to be easily discharged to the exterior when the internal temperature of the electrochemical device abnormally increases. On the other hand, when the polymeric shell is formed of a polymer that undergoes a drop in the polymer crystallinity or binding force when the temperature of the electrochemical device abnormally increases, it allows the core material or gas generated from the core material to be easily discharged to the exterior.

Generally, a polymer does not allow any phase transition, such as vaporization, due to its high molecular weight. However, when heat energy is applied to a polymer, the polymer shows an increase in the intermolecular kinetic energy and causes random arrangement of crystals, resulting in a glass transition accompanied by the viscosity and flowability of the polymer. The temperature at this time is called glass transition temperature ($T_g$). Additionally, when heat energy is applied to the polymer at a temperature higher than the glass transition temperature, an amorphous polymer undergoes structural expansion and a crystalline polymer reaches its melting point ($T_m$), and thus such polymers start to undergo structural collapse.

Thus, the polymeric shell according to the present invention preferably has a glass transition temperature ($T_g$) or melting point ($T_m$) in a temperature range higher than the normal drive temperature of an electrochemical device and/or in a voltage range higher than 4.3V or higher than the applicable voltage of an electrochemical device. The applicable voltage may range from 4.3V to 4.7V.

More preferably, the polymeric shell has a glass transition temperature ($T_g$) and/or melting point ($T_m$) in a temperature range similar to the gas phase change temperature or gas generation temperature ($T_c$) of the core material.

Herein, the polymer has a glass transition temperature ($T_g$) and/or melting point ($T_m$) equal to or higher or lower than the gas phase change temperature or gas generation temperature of the core material. For example, when the polymer has a glass transition temperature ($T_g$) and/or melting point ($T_m$) lower than the gas phase change temperature or gas generation temperature ($T_g$: core) of the core material ($T_g$, $T_m < T_c$), the polymer melts or undergoes a drop in crystallinity as the temperature increases, so that the core-shell structure is broken down and the gas generating material contained in the core is discharged to the exterior. On the contrary, when the polymer has a glass transition temperature ($T_g$) and/or melting point ($T_m$) higher than the gas phase change temperature or gas generation temperature ($T_c$: core) of the core material ($T_g$, $T_m > T_c$), the gas generating material (i.e. the core) undergoes a phase change into a gas phase in advance of the melting or glass transition of the polymer, and such gas generation causes significant volumetric expansion of the polymeric shell, resulting in a collapse of the core-shell structure.

The polymeric shell according to the present invention has a glass transition temperature ($T_g$) and/or melting point ($T_m$) of 60~200° C. Preferably, the glass transition temperature ($T_g$) and/or melting point ($T_m$) is 80~150° C., and more preferably 100~130° C.

The polymeric shell may be a polymer obtained by polymerization or copolymerization of monomer components generally known to those skilled in the art. Non-limiting examples of the monomers that may be used in the present invention include (meth)acrylate compounds, (meth)acrylonitrile compounds, (meth)acrylic acid compounds, (meth)acrylamide compounds, styrene compounds, vinylidene chloride, halogenated vinyl compounds, butadiene compounds, ethylene compounds, acetaldehyde, formaldehyde or a mixture thereof. Also, the polymer may be polypropylene or polyethylene.

Figure 3:
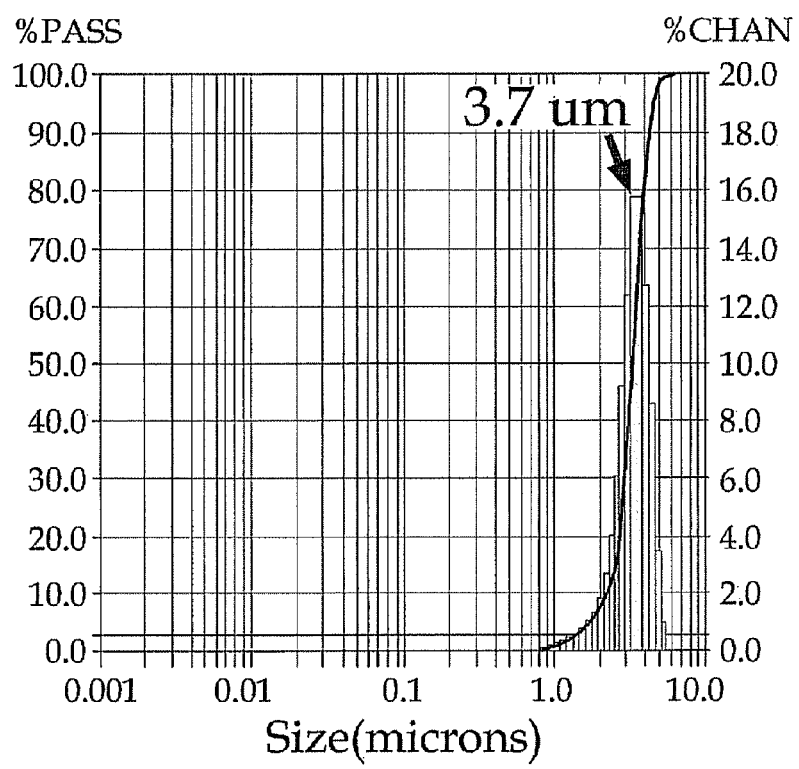
FIG. 3a is a graph showing the particle size distribution in the spherical gas discharge member with a core-shell structure.
FIG. 3b is a photographic view of the gas discharge member as shown in FIG. 3a, taken by TEM (transmission electron microscopy)
Figure 3:
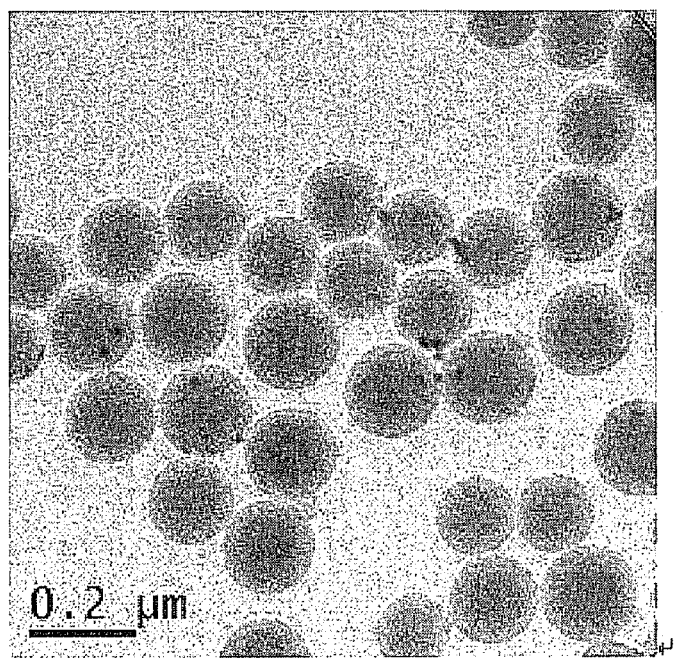

There is no particular limitation in the shape of the polymer shell, as long as the gas generating material can be encapsulated with the polymer shell. For example, as shown in FIG. 1, the polymer shell may have a capsule-like, straw-like (FIG. 1(a)) or spherical shape (FIG. 1(b)). There is no particular limitation in the size of the shell, a spherical polymeric shell has a diameter of 2 μm or less (as expressed by the diameter of a unitary particle not that of agglomerated particles), and preferably of 10~400 nm (see FIG. 3b).

The core portion forming the gas discharge member according to the present invention may include a compound capable of generating gases other than oxygen at a predetermined temperature range.

The core material may be a material that exists in the state of a solid or liquid at a temperature lower than a predetermined temperature, and undergoes a phase change at a temperature equal to or higher than the predetermined temperature. The above phase change means a phase transition from a solid or liquid phase into a gas phase. Non-limiting examples of such core materials include a cryogenic liquid, a sublimable material, or a mixture thereof.

The cryogenic liquid or sublimable material undergoes a phase change by absorbing heat from its surroundings, and thus serves to reduce the temperature of an electrochemical device. Particularly, the cryogenic liquid can rapidly reduce the temperature of the device via the heat exchange with a substance present inside the device. Herein, when the gas generated from such phase changes is an inert gas, the gas can prevent the inflammable materials from coming in contact with oxygen, and thus can inhibit the device from ignition.

Non-limiting examples of the cryogenic liquid include liquid nitrogen, liquid helium, liquid neon, liquid argon, liquid carbon dioxide, chlorofluorocarbon (CFC) or hydrochlorofluorocarbon, HCFC) used as a coolant, hydrofluorocarbon (HFC) used as a substitute for the above coolant, hydrocarbon (HC) or a mixture thereof.

Non-limiting examples of the sublimable material include iodine, naphthalene, camphor, dry ice, freon, or the like. Also, hexane, diethyl ether, acetonitrile, tetrahydrofuran, water, or the like may be used.

The core material according to the present invention may be a material that is thermally decomposed at a predetermined temperature range to generate gases. The material generating gases via thermal decomposition may generate the gas by being thermally decomposed after or before they are discharged to the exterior of the polymeric shell.

The core material generating gases via thermal decomposition may be a material that is thermally decomposed in itself to generate gases, such as carbon dioxide or nitrogen. Non-limiting examples of the material include azo compounds (discharging nitrogen gas), organic peroxides (discharging carbon dioxide), hydrazide compounds (discharging nitrogen gas), carbazide compounds (discharging nitrogen gas), carbonate compounds (discharging carbon dioxide), or the like.

More particularly, non-limiting examples of the azo compounds include 2,2'-azobis(isobutyronitrile), 2,2'-azobis(2-methylbutyronitrile), 2,2'-azobis(2-methylvaleronitrile), 2,2'-azobis(2,3-dimethylbutyronitrile), 2,2'-azobis(2-methylcapronitrile), 2,2'-azobis(2,4-dimethylvaleronitrile), 1,1'-azobis(1-cyclohexylcyamide, 2,2'-dimethoxy-2,2'-azopropane, 2,2'-diethoxy-2,2'-azopropane, 2,2'-dipropoxy-2,2'-azopropane, 2,2'-diisopropoxy-2,2'-azopropane, 2,2'-dibutoxy-2,2'-azopropane, 2,2'-diisobutoxy-2,2'-azopropane, 2,2'-dineobutoxy-2,2'-azopropane, azodicarbonamide, or a mixture thereof.

Additionally, non-limiting examples of the organic peroxides include bis(3-methyl-3-methoxybutyl)peroxy dicarbonate, t-butyl peroxyneodecanoate, t-butyl peroxy pivalate, dilauroyl peroxide, distearyl peroxide, t-butyl peroxy-2-ethylhexanoate, benzoyl peroxide, t-butyl peroxylaurate, t-butylperoxy 2-ethylhexylcarbonate, t-butylperoxybenzoate, t-hexyl peroxybenzoate, dicumyl peroxide, t-butyl cumylperoxide, di-t-butyl peroxide, 2,5-dimethyl-2,5-bis(t-butyl peroxy)hexane, or a mixture thereof.

Further, non-limiting examples of the hydrazide compounds include benzosulfonylhydrazide, 4,4'-oxybis(benzenesulfonylhydrazide, p-toluenesulfonylhydrazide, polybenzenesulfonylhydrazide, bis(hydrazosulfonyl)benzene, 4,4'-bis(hydrazosulfonyl)biphenyl, diphenyldisulfonylhydrazide, diphenylsulfone-3,3-disulfonylhydrazide, or a mixture thereof.

Further, non-limiting examples of the carbazide compounds include terephthalzide, other fatty acid azides, aromatic acid azides, or a mixture thereof.

Since the above compounds have different gas generation temperatures, the gas generation temperature of the gas discharge member may be suitably controlled by varying the particular type of the core material to be used.

The core material according to the present invention may be an ionic salt formed of a cation and an anion. When the ionic salt is discharged out of the polymeric shell, it moves to the anode and cathode included in the electrochemical device and can cause reduction and oxidation at the anode and cathode, respectively. On one hand, the anion of the ionic salt generates an incombustible gas at the cathode so as to convert the atmosphere inside the device into incombustible atmosphere. On the other hand, the cation of the ionic salt reacts with electrons at the anode to reduce the number of electrons highly accumulated at the anode due to a short or overcharge, and thus can inhibit an increase in the temperature of the device caused by rapid current flow.

For example, when the ionic salt is NaCl, $Na^+$ of the NaCl discharged out of the polymeric shell moves to the anode and reacts with electrons, resulting in precipitation of metal (Na). Additionally, $Cl^-$ moves to the cathode, undergoes oxidation to generate incombustible $Cl_2$ gas, and thus can improve the safety of the device. Non-limiting examples of the ionic salt include $Al_2(SO_4)_3$, $Ca(OH)_2$, $Mg(NO_3)_2$, $PbI_2$, NaCl, $MgCl_2$, $Al_2(OH)_3$ or a mixture thereof.

In the gas discharge member according to the present invention, the core material and the polymeric shell are used preferably in a weight ratio (%) of 1~40:99~60. However, the scope of the present invention is not limited thereto. If the core material is used in an excessively low amount, the gas discharge material contained in the core decreases in amount accordingly. Thus, it is not possible to sufficiently improve the safety of the electrochemical device. If the shell material is used in an excessively low amount, it is difficult to form a core-shell structure.

The gas discharge member according to the present invention generates gases preferably at a temperature (T) higher than the normal drive temperature of the electrochemical device. For example, the gas generation temperature may be at least 50° C., where the electrolyte used in the device can be decomposed, and is preferably 60~200° C.

There is no particular limitation in the gas discharged from the gas discharge member, as long as the gas includes no oxygen, that is, no ignition factor. For example, the gas may include an inert gas, a fire extinguishing gas, inflammable gas, or a combination thereof.

Non-limiting examples of the inert gas include $N_2$, He, Ne, Ar, Kr, Xe or a mixture thereof. Non-limiting examples of the fire extinguishing gas include $CO_2$, $F_2$, $Cl_2$, $Br_2$ or a mixture thereof. Non-limiting examples of the inflammable gas include propane, hydrogen, propylene, carbon monoxide, methane, ethane, ethylene or a mixture thereof.

There is no particular limitation in the amount of the gas discharged from the gas discharge member, as long as the gas discharge amount is in such a range that the safety of the device is ensured. Preferably, the gas discharge amount is 100 ml/g or more, and more preferably 150~400 ml/g.

Figure 5:
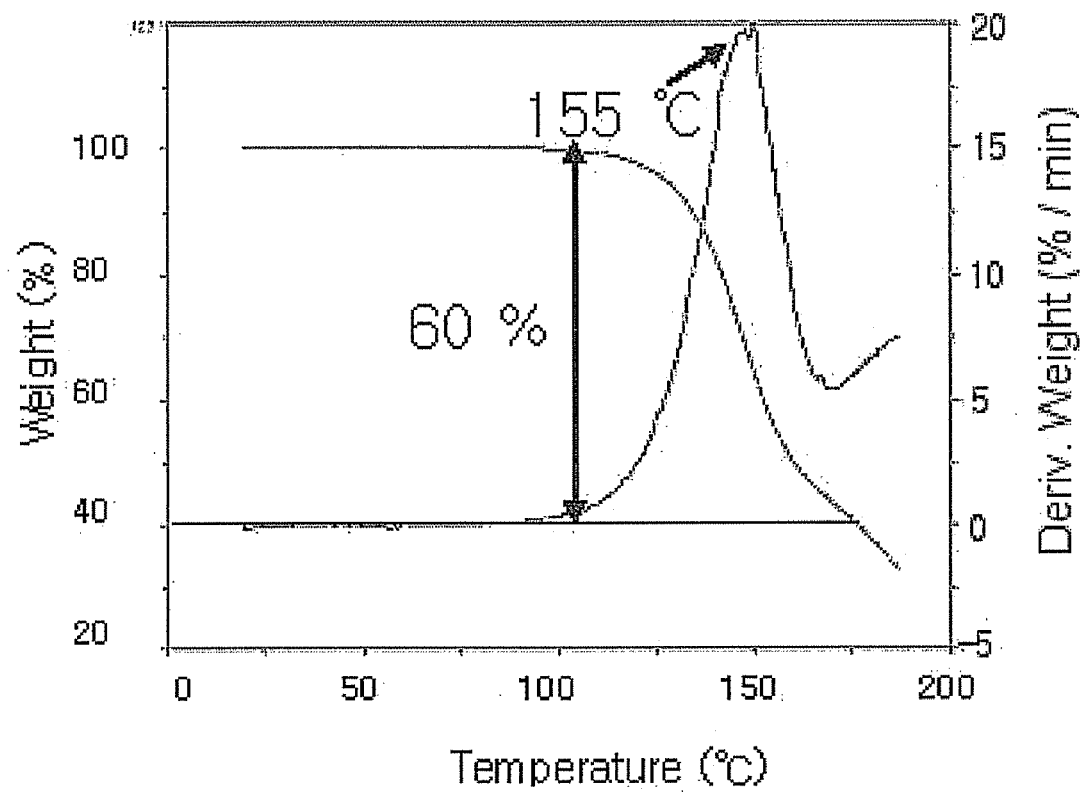
FIG. 5 is a graph showing the decomposition temperature and decomposition level of an azo-based compound as a gas generating material.
Figure 6:
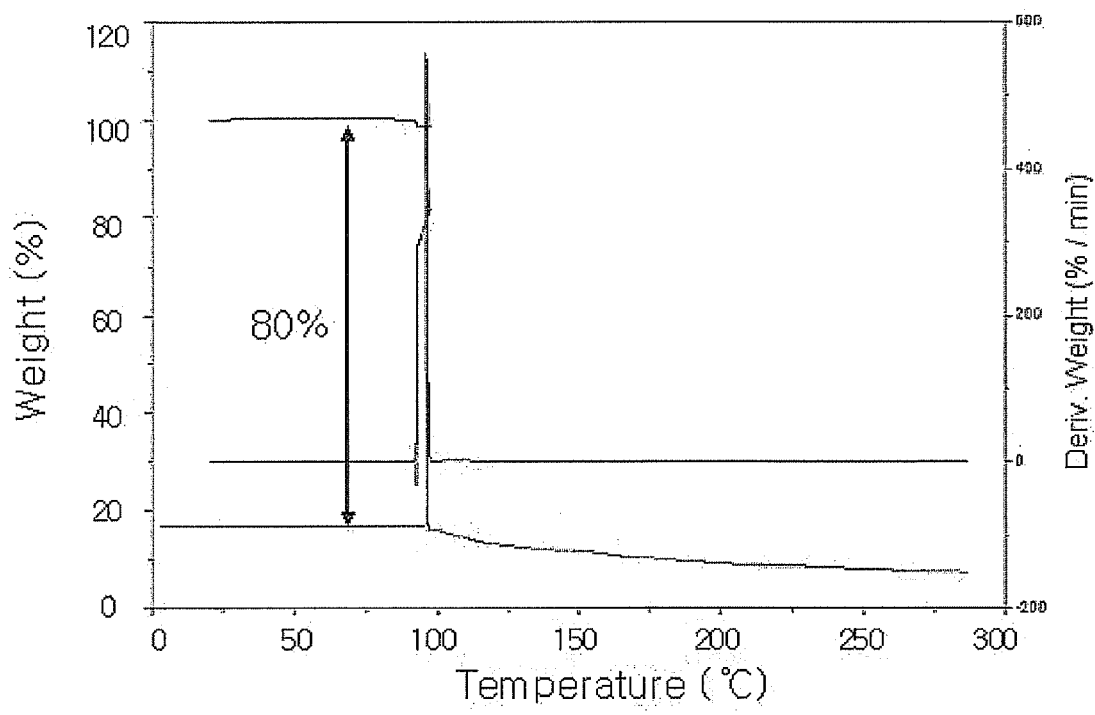
FIG. 6 is a graph showing the decomposition temperature and decomposition level of a peroxide-based compound as a gas generating material.

For example, 2,2'-azobis(2-cyanobutane) rapidly discharges nitrogen gas in an amount of about 250 ml/g at a temperature of 100~120° C., azodicarbonamide (ADCA) discharges 180~240 mg of nitrogen gas, and OBSH (p,p'-oxybis (benzenesulfonyl hydrazide) discharges 120~130 ml/g of nitrogen gas. Therefore, it is possible to improve the safety of the electrochemical device (see FIGS. 5 and 6).

According to the present invention, it is also possible to control the gas discharge amount by adjusting the amount of the gas discharge material and that of the electrolyte. For example, when approximately 0.4 g of the gas discharge material is introduced into the device, it can be estimated that the gas discharge amount is 100 ml. When the amount of inflammable gases generated from the electrolyte is controlled to 5 vol % or less, i.e. 5 ml or less, the total gas generation (105 ml) causes an increase in the internal pressure of the device, and thus causes early operation of a CID (current interrupt device). Therefore, it is possible to further improve the safety of the device by controlling the gas discharge amount.

The gas discharge member according to the present invention may be obtained by using the core material and the shell material. Two typical embodiments are applicable to obtain the gas discharge member.

In the first embodiment, monomers for forming the polymeric shell and the gas generating material are mixed in a reactor, and the monomers are polymerized while agitating the resultant mixture. The gas discharge member obtained by the first embodiment has the structure as shown in FIG. 1b.

There is no particular limitation in the method for carrying out the above polymerization. The polymerization may be performed via a mini-emulsion polymerization process, inverse emulsion polymerization process, seed emulsion polymerization process, direct emulsification process, or the like. To perform the polymerization, the monomers, water, a solvent, a polymerization initiator, a pH buffering agent, or a mixture thereof may be used as starting materials.

The gas discharge member formed by the polymerization may be separated via a centrifugal separation process. Then, the gas discharge member may be dried or may be used in a solvent.

In the second embodiment, the gas generating material is added to the polymeric shell preliminarily formed to have a shape capable of encapsulating the gas generating material, followed by heat processing and sealing. The gas discharge member obtained from the second embodiment has the structure as shown in FIG. 1a.

<Electrochemical Device Including Gas Discharge Member>

The present invention also provides an electrochemical device including the above-mentioned gas discharge member disposed in the interstitial volumes thereof.

To ensure the safety as well as the quality of the device, it is preferred to introduce the gas discharge member into the interstitial volumes of the device, where no electrochemical reaction occurs. For example, the gas discharge member may be introduced into the inner part of a mandrel, the inner part of a center pin, the top or bottom of the inner part of the casing of the device, or a combination thereof.

The gas discharge member may be introduced into the electrochemical device according to the present invention by using various embodiments, and preferably the following three embodiments:

(1) In the first embodiment, the gas discharge member with a core-shell structure is inserted into the inner space of a mandrel or center pin. This may be applied to an electrochemical device using a mandrel or center pin.

The gas discharge member may be introduced into the inner space of a mandrel or center pin to 100 vol % thereof. However, considering an increase in the volume depending on variations in the temperature, the gas discharge member is introduced into the inner space of a mandrel in an amount of 10~80 vol %. Herein, there is no particular limitation in the methods for inserting the gas discharge member into the mandrel or center pin.

(2) In the second embodiment, the gas discharge member with a core-shell structure is mixed with an electrolyte, is used as a binder so as to be introduced as a constitutional element forming an electrode, and/or is coated onto the surface of a separator.

(3) In the third embodiment, the gas discharge member is coated partially or totally onto the casing of an electrochemical device. Preferably, the casing is dipped into a coating solution containing particle-shaped gas discharge members or is coated with the gas discharge member-containing coating solution via a conventional process known to those skilled in the art, followed by drying, to provide the electrochemical device.

The second and the third embodiments may be applied to an electrochemical device using no mandrel or center pin. In this case, a great amount of gas discharge members can be received in the interstitial volumes of the device and distributed uniformly over the interstitial volumes. Thus, when the internal temperature of the device abnormally increases, a large amount of gas can be generated in all directions of the casing.

There is no particular limitation in the shape and composition of the casing for an electrochemical device to which the gas discharge member can be introduced. For example, the casing may have a cylindrical, prismatic, pouch shape, etc. Also, a thin film-like casing or a large-size casing may be used.

The gas discharge member introduced into the electrochemical device according to the above preferred embodiments can be controlled in such a manner that the concentration of at least one gas of inflammable gases and combustion aid gases present or generated in the device is out of the explosive limit in order to ensure the safety of the device.

In other words, the electrochemical device, as produced, is in a vacuum state with a small amount of air inside thereof. However, when the temperature of the device increases to 80° C. or higher, vaporization of the liquid electrolyte occurs. Additionally, when the temperature increases to 160° C. or higher or the voltage increases to 4.4V or higher, decomposition of the electrolyte occurs to generate inflammable gases, such as hydrogen, propylene, carbon monoxide, methane, ethane or ethylene (see Table 1). Further, when the temperature increases to 170° C. or higher or the voltage increases to 4.7V or higher, oxygen present in a lithium metal composite oxide used as a cathode active material is generated. Therefore, when inflammable materials (inflammable gases) face to a temperature higher than the ignition point inside the device in the presence of a combustion aid gas (oxygen), ignition and explosion of the device inevitably occur.

Under these circumstances, the inventors of the present invention have focused their thoughts on the fact that the inflammable gases and/or combustion-aid gases present inside the device do not always cause the combustion and explosion, but cause the explosion only when they are in a range corresponding to the explosive limit. Thus, the gas discharge member is used to control the concentration of the inflammable gases and/or combustion aid gases in the device.

For example, when an electrochemical device is equipped with a gas discharge member discharging inflammable gases, the gas discharge member discharges a great amount of inflammable gases at a predetermined temperature range. Therefore, it is possible to control the concentration of the inflammable gases in the device to a degree higher than the upper explosive limit. On the contrary, when the gas discharge member discharges a great amount of incombustible gases, it is possible to control the concentration of the inflammable gases in the device to a degree lower than the lower explosive limit.

The following Table 1 shows the explosive limits of inflammable gases in the air. More particularly, Table 1 shows the lower explosive limits and the upper explosive limits of the inflammable gases generated via the decomposition of an electrolyte solvent due to the voltage or temperature conditions.

Herein, the air present inside an electrochemical device, whose inner part is insulated from the outer part, is different from the ambient air in terms of the kinds and proportions of the gases. Thus, it is necessary to transform the explosive limits in the air into those in the atmosphere inside the device. However, when a pressure regulating valve, such as a vent, is opened due to the generation of inflammable or incombustible gases depending on the temperature, followed by an increase in the internal temperature of the device, a large amount of the ambient air is introduced into the device. In this case, it is thought that the atmosphere inside the device is similar to the ambient air.

TABLE 1

| Gas | Explosive limit (vol %) |
|---|---|
| Ammonia | 15-28 |
| Carbon monoxide | 12.5-74 |
| Methane | 5-15 |
| Ethane | 5-12.5 |
| Acetylene | 2.5-81 |
| Propane | 2.1-9.5 |
| Butane | 1.8-8.4 |

Therefore, it is thought that when inflammable gases are present in a concentration (proportion) of less than 5 vol % per 100 vol % of the air, based on methane and ethane which are generated via the decomposition of an electrolyte solvent, or in a concentration of greater than 74 vol %, based on carbon monoxide, upon the decomposition of the electrolyte, it is possible to significantly reduce the possibility of explosion.

The above explosive limits of the inflammable gases are different depending on the particular kind of gas. However, it is possible to determine an adequate inert gas discharge member with a core-shell structure and the amount thereof considering the explosive limits of the gases. In other words, it is preferred that a material generating inert gases is introduced as much as possible to decrease the concentration of inflammable gases to a range less than the lower explosive limits.

Meanwhile, when a gas discharge member discharging an inert gas other than oxygen is used, the concentration of the combustion aid gases in the device can be controlled to be less than the lower explosive limits. Such a significant drop in the oxygen proportion does not allow a general combustion process, and thus ignition and explosion of the device cannot occur, even in the presence of inflammable materials under a temperature higher than the ignition point.

<Combination of Gas Discharge Member with Safety Device>

The electrochemical device according to the present invention may further comprise a safety device capable of improving the safety of the device in cooperation with the gas discharge member.

Although electrochemical devices have included a safety device, such as a CID (current interrupt device) and/or vent to improve the safety, it has been difficult to drive the safety device desirably. In fact, although a CID and a vent are designed to be driven at 10~16 kg/cm$^3$ and 18 kg/cm$^3$, respectively, it is necessary to increase the internal pressure of the device as the temperature increases so as to drive the safety device. If the internal pressure is too low to drive the CID or vent, even in the presence of inflammable gases generated via the decomposition of an electrolyte and oxygen generated via the decomposition of a cathode active material, the inner atmosphere of the device is gradually converted into an ignitable atmosphere, resulting in explosion of the device.

Thus, according to the present invention, it is possible to use the gas discharge member capable of generating a large amount of gas by being rapidly decomposed in a narrow temperature range in order to help such an increase in the internal pressure of the electrochemical device. In other words, when the temperature of the electrochemical device abnormally increases, a large amount of gas is generated from the gas discharge member and the internal pressure of the device significantly increases so as to accelerate the operation of the safety device and to prevent the ignition and explosion of the electrochemical device.

There is no particular limitation in the safety device, as long as the safety device can detect variations in the temperature, pressure and current in the electrochemical device, and thus can interrupt the operation of the electrochemical device or can promptly convert an abnormal condition inside the electrochemical device into a normal condition.

Preferably, it is possible to use: (a) a first safety device that detects variations in the pressure inside the electrochemical device to interrupt charging of the electrochemical device or to convert a charging condition into a discharging condition; (b) a second safety device that detects variations in the pressure inside the electrochemical device to emit the heat present inside the electrochemical device; or (c) both the first safety device and the second safety device.

Non-limiting examples of the first safety device that may be used in the present invention include a pressure-sensitive device, such as a conventional CID known to those skilled in the art. The pressure-sensitive device may be a monolithic device, or may comprise: (i) a pressure-sensitive member; (ii) an electric wire for conducting current transferred from the pressure-sensitive member; and (iii) a member that responds to the current conducted from the electric wire to interrupt charging of the electrochemical device or to convert a charging condition into a discharging condition.

The pressure-sensitive device refers to a device that can detect a variation in the pressure inside the sealed electrochemical device, i.e. an increase in the pressure, and can be deformed to interrupt current flow by itself; or can generate current toward the exterior or a control circuit to interrupt charging of the electrochemical device. Herein, the pressure-sensitive device may be a monolithic device serving not only as a safety device but also as a pressure-sensitive member. Otherwise, a separate pressure-sensitive device independent from a safety device may be used.

Particular examples of the pressure-sensitive device include piezoelectric crystals generating electric current by detecting a variation in the pressure. Additionally, there is no particular limitation in the pressure range where the pressure-sensitive device operates, as long as the pressure range is out of the conventional internal pressure of the electrochemical device and does not allow explosion. Preferably, the pressure range is 5~20 kg/cm².

Additionally, there is no particular limitation in the second safety device, as long as the second safety device detects variations in the pressure inside the electrochemical device to emit the heat or gas (e.g. inflammable gas, etc.) present inside the electrochemical device to the exterior. Non-limiting examples of the second safety device include a pressure regulating valve, such as a vent.

There is no particular limitation in the temperature range where the first safety device and the second safety device operate. Preferably, the first safety device and the second safety device drive operate at 130° C. or lower and 150° C. or lower, respectively.

In the electrochemical device including the gas discharge member and the safety device at the same time, an increase in the internal pressure inside the device is enhanced due to the gas pressure discharged from the gas discharge member at a temperature higher than the normal drive temperature of the device, or at a voltage of 4.3V or higher. Such an increase in the internal pressure allows early operation of the first safety device and/or the second safety device, and thus discharges oxygen or inflammable gases required for ignition, an electrolyte, and heat accumulated inside the device, which serve to cause a fire, to the exterior, so as to prevent the device from ignition and explosion.

The electrochemical device according to the present invention includes all types of devices in which electrochemical reactions are performed. Particular examples of the electrochemical device include all types of primary batteries, secondary batteries, fuel cells, solar cells, capacitors, or the like. Among the secondary batteries, lithium secondary batteries, including lithium metal secondary batteries, lithium ion secondary batteries, lithium polymer secondary batteries or lithium ion polymer secondary batteries, are preferred. However, besides the lithium secondary batteries, the present invention may be applied to Ni-MH batteries, Ni—Cd batteries, or the like. Also, the present invention may be applied to any batteries to be developed as substitutes for lithium secondary batteries.

The electrochemical device may be obtained by using a conventional method known to those skilled in the art. In a preferred embodiment of the method, an electrode-separator assembly is formed from a cathode, an anode and a separator interposed between both electrodes, and then an electrolyte is injected thereto. Herein, the gas discharge member may be introduced into at least one of a mandrel, a center pin and the inner space of a casing.

There is no particular limitation in the anode, cathode, electrolyte and the separator used in combination with the gas discharge member, and include those currently used in electrochemical devices.

Further, the present invention provides a center pin for an electrochemical device, which is inserted into a mandrel of a wound electrode-separator assembly received in a casing for the electrode-separator assembly, and includes a gas discharge member comprising: (a) a core portion containing a compound that discharges gases other than oxygen at a predetermined temperature range; and (b) a polymeric shell portion for encapsulating the compound and surrounding the core portion, the gas discharge member being inserted into inner volumes of the device.

Herein, there is no particular limitation in the shape, material, size, etc. of the center pin to which the gas discharge member is introduced.

Reference will now be made in detail to the preferred embodiments of the present invention. It is to be understood that the following examples are illustrative only and the present invention is not limited thereto.

EXAMPLE 1

1-1. Preparation of Gas Discharge Member

A polymeric shell having a straw-like shape and formed of a polypropylene material was used. One end of the polymeric shell was sealed via hot fusion, 0.4 g of an azo compound, i.e. 2,2'-azobis(2-cyanobutane) represented by the following Formula 1 was introduced into the polymeric shell as a gas discharge material discharging gases at a specific temperature, and the other end was hot sealed to provide a gas discharge member. The gas discharge member was provided to have a size corresponding to the largest center pin. The gas discharge member had the structure as shown in FIG. 1a.

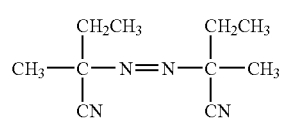

[Formula 1]

1-2. Manufacture of Mandrel

The capsule type gas discharge member obtained from Example 1-1 was inserted into the mandrel of a battery.

1-3. Secondary Battery

Carbon powder, a PVDF binder and a conductive agent were mixed in a weight ratio of 92:4:4, and the mixture was dispersed into NMP to provide anode slurry. The anode slurry was coated uniformly onto Cu foil with a thickness of 10 μm via a comma coating process using a comma gap of 200 μm, followed by drying. The coating speed was set to 3 m/min.

Next, 92 parts by weight of a lithium cobalt composite oxide, 4 parts by weight of carbon as a conductive agent and 4 parts by weight of an acrylate polymer having a core-shell structure as a binder were added to NMP as a solvent to provide cathode slurry. The cathode slurry was coated onto a cathode collector, i.e. an Al thin film having a thickness of 20 μm. The same coating process as the anode was used.

A porous polyethylene film was used as a separator.

The strip-like anode and cathode were stacked on the separator to form a electrode-separator assembly and the assembly was wound around the mandrel obtained according to Example 1-2 many times to provide a jelly roll-like structure. The jelly roll was controlled to have a length and width sufficient to be received in a battery can having an outer diameter of 18 mm and a height of 65 mm. The jelly roll was received into a battery can and insulation plates were disposed on the top and bottom surfaces of electrodes. Then, an anode lead formed of nickel was drawn from the collector and welded to the battery can. A cathode lead formed of aluminum was drawn from the cathode collector and welded to an aluminum pressure regulating valve mounted to a battery cover, thereby providing a battery.

Finally, an electrolyte comprising $LiPF_6$, an electrolyte salt, dissolved in a solvent containing a mixture of EC with EMC (EC:EMC=1:2 on the volume basis) was injected into the battery.

EXAMPLE 2

A gas discharge member, a mandrel and a lithium secondary battery were provided in the same manner as described in Example 1, except that 0.4 g of benzoyl peroxide (BPO) represented by the following Formula 2 was used as a compound discharging gases at a specific temperature, instead of 2,2'-azobis(2-cyanobutane).

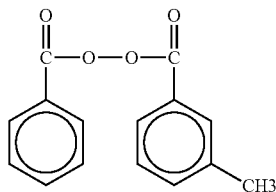

[Formula 2]

COMPARATIVE EXAMPLE 1

A lithium secondary battery was provided in the same manner as described in Example 1, except that no gas discharge member was used.

COMPARATIVE EXAMPLE 2

A lithium secondary battery was provided in the same manner as described in Example 1, except that the gas discharge material, 2,2'-azobis(2-cyanobutane) was injected directly into the electrolyte.

COMPARATIVE EXAMPLE 3

A lithium secondary battery was provided in the same manner as described in Example 1, except that benzoyl peroxide (BPO) was injected directly into the electrolyte instead of 2,2'-azobis(2-cyanobutane).

EXPERIMENTAL EXAMPLE 1

The following test was performed to evaluate the electrochemical stability of the gas discharge material according to the present invention.

As gas discharge materials, 2,2'-azobis(2-cyanobutane) and benzoyl peroxide (BPO) were injected into an electrolyte and the resultant electrolyte was injected into a battery to provide a finished battery. Then, cyclovoltammetry was used to measure the stability of each of the above compounds in terms of the anode potential and the cathode potential.

Figure 7:
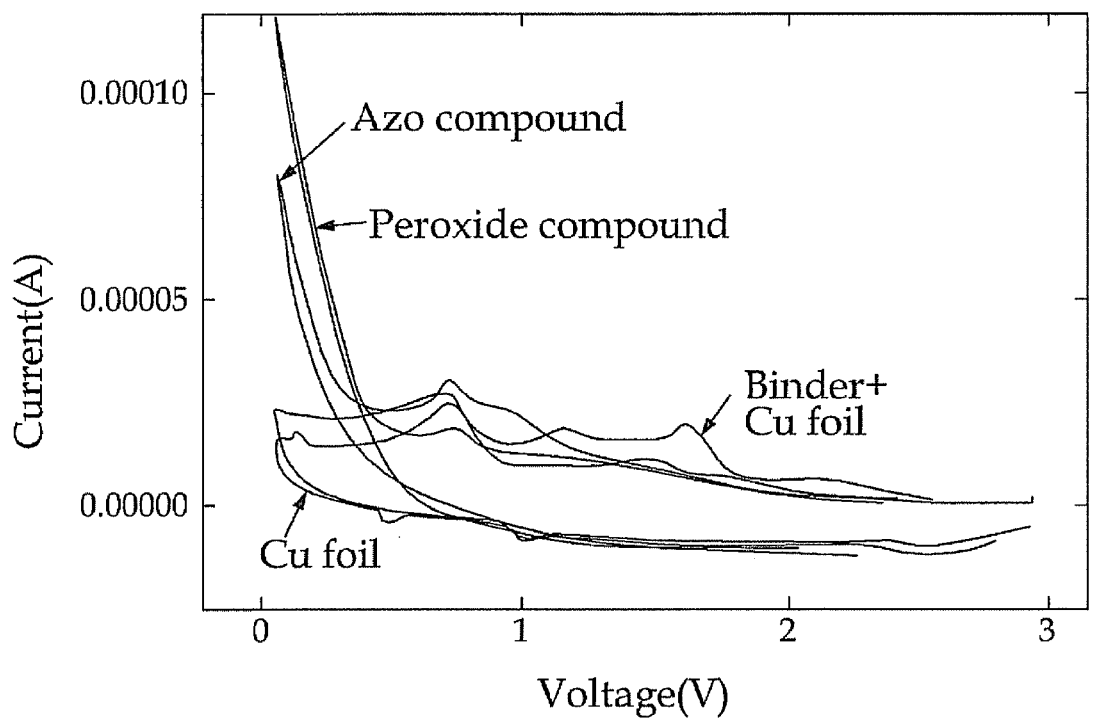
FIG. 7 is a graph showing the electrochemical stability of the gas discharge member with a core-shell structure introduced into an electrolyte, as measured by CV (cyclovoltammetry)

After the test, it could be seen that the collector and the binder were stable with no specific reaction, while the azo compound and peroxide compound were reactive to the anode in a voltage range of 0~1 V (see FIG. 7).

Figure 2:
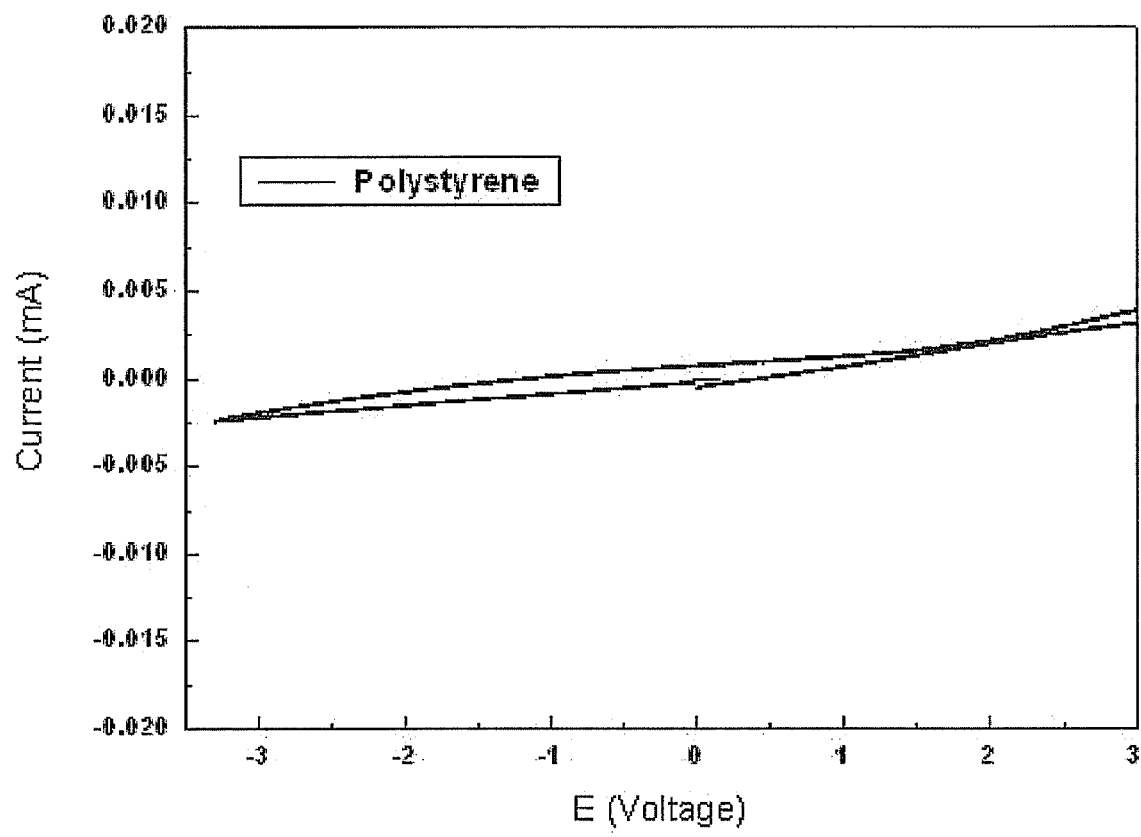
FIG. 2 is a graph showing the electrochemical stability of the polystyrene polymer shell in the gas discharge member with a core-shell structure.

Meanwhile, it could be seen that a polystyrene polymer was stable, with no reactivity in a voltage range applicable to a lithium secondary battery (see FIG. 2).

As can be seen from the above results, it is not possible to improve the safety of an electrochemical device merely by introducing a gas discharge material alone into the device.

EXPERIMENTAL EXAMPLE 2

Evaluation of Physical Properties of Gas Discharge Materials

The following test was performed to measure the gas generation amount of the gas discharge material according to the present invention.

As gas discharge materials, 2,2'-azobis(2-cyanobutane) and benzoyl peroxide (BPO) were used, and the above compounds were introduced into a chamber and gradually heated at 80° C.

After the test, it could be seen that about 60 wt % of the azo compound was decomposed at a temperature ranging from 100C to 170° C., while about 80 wt % of the peroxide compound was decomposed at a temperature ranging from 100C to 105° C. (see FIGS. 5 and 6).

Figure 4:
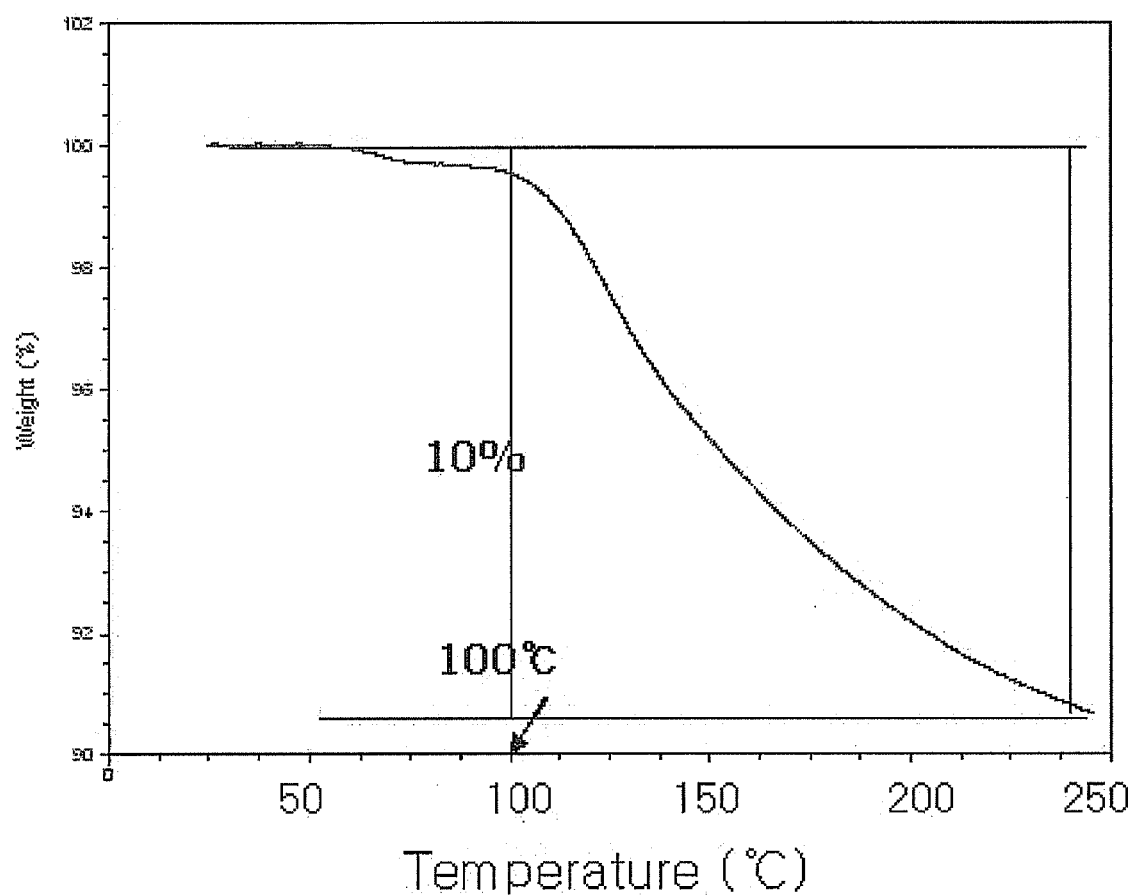
FIG. 4 is a graph showing the amount of the core material introduced into the gas discharge member with a core-shell structure as measured by TGA (thermogravimetric analysis)

Additionally, FIG. 4 shows the amount of the peroxide compound used as a core material for the gas discharge member with a core-shell structure, as measured by TGA (thermogravimetric analysis). It could be seen that the amount of the core was 10 parts by weight as demonstrated by a weight loss of about 10% in the peroxide compound.

EXPERIMENTAL EXAMPLE 3

Evaluation of Over-Charge Safety

The lithium secondary battery including a mandrel, into which the gas discharge member was inserted, was used as a sample. The battery obtained via a conventional process according to Comparative Example 1 was used as a control.

Each battery was charged to 4.2 V under a constant-current condition. The batteries had a standard capacity of 2400 mAh, and were measured for their capacities and efficiencies while being discharged at a rate of 1 C (2400 mA/h) and 0.2 C (480 mA/h) from 4.2V to 3V under a constant-current condition. Next, each battery was charged to 4.2V under a constant current condition and was rapidly charged to 18.5V at 4.8 A in order to perform an overcharge test. Then, the operation time of the CID (current interrupt device) as a pressure-sensitive device was measured and the external temperature of the battery was also measured.

Figure 8:
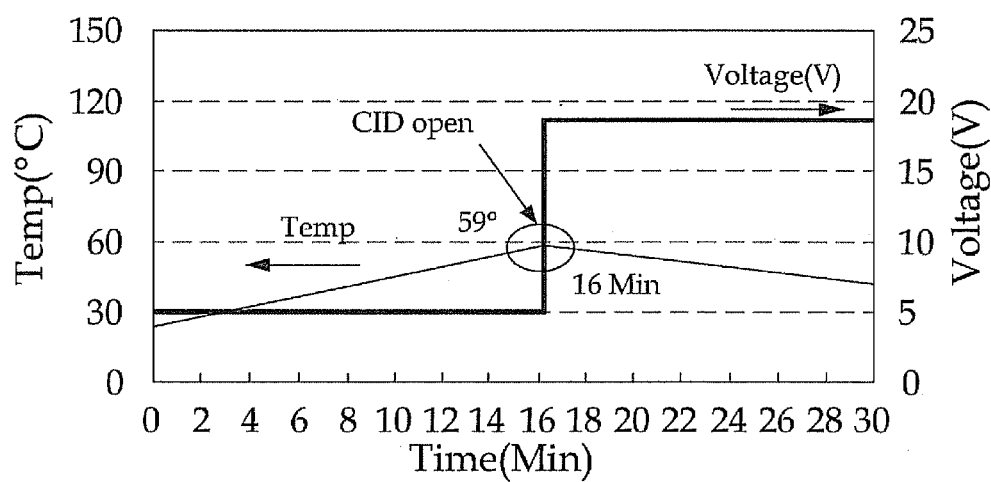
FIG. 8 is a graph showing the over-charge test results of the battery having the gas discharge member with a core-shell structure according to Example 1.
Figure 8:
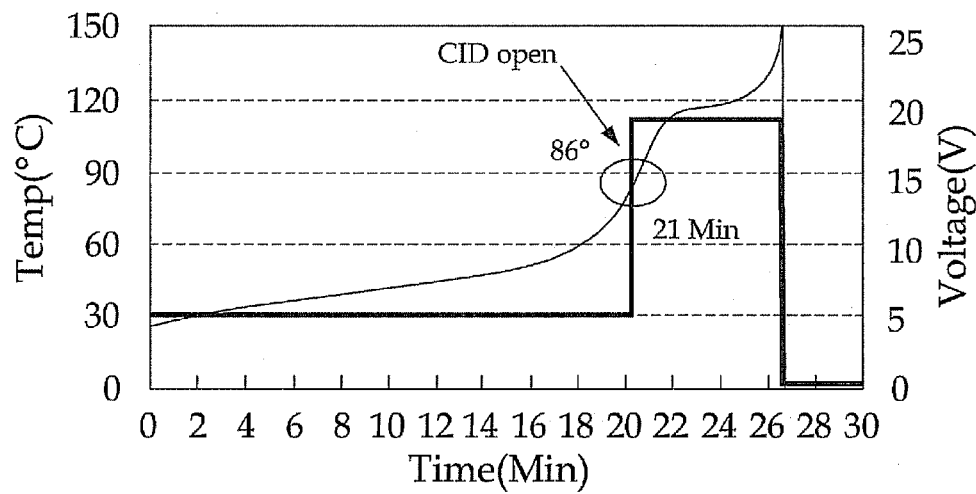

After the test, the battery according to Comparative Example 1 showed an increase in the temperature to about 86° C. in 21 minutes, and the battery temperature increased continuously. In other words, the battery according to Comparative Example 1 showed significant degradation of its thermal safety. Further, the battery ignited and exploded, and thus could not be regenerated (see FIG. 8b).

On the contrary, the battery according to Example 1 showed an increase in the temperature to 59° C. However, after that, the battery showed a drop in the temperature, i.e. a significant improvement in the battery safety (see FIG. 8a).

EXPERIMENTAL EXAMPLE 4

Evaluation Of High-Temperature Safety

Each of the batteries according to Example 2 and Comparative Example 1 was charged to 4.2 V under a constant current condition, heated to 150° C. at a rate of 5° C./min, and maintained at the same temperature for 1 hour. Next, the operation time of the CID (current interrupt device) and the battery temperature during the operation of the CID were measured. Also, the batteries were observed whether they ignited or exploded after being heated to 150° C., and the time required for the generation of such event (ignition or explosion) was measured.

Figure 9:
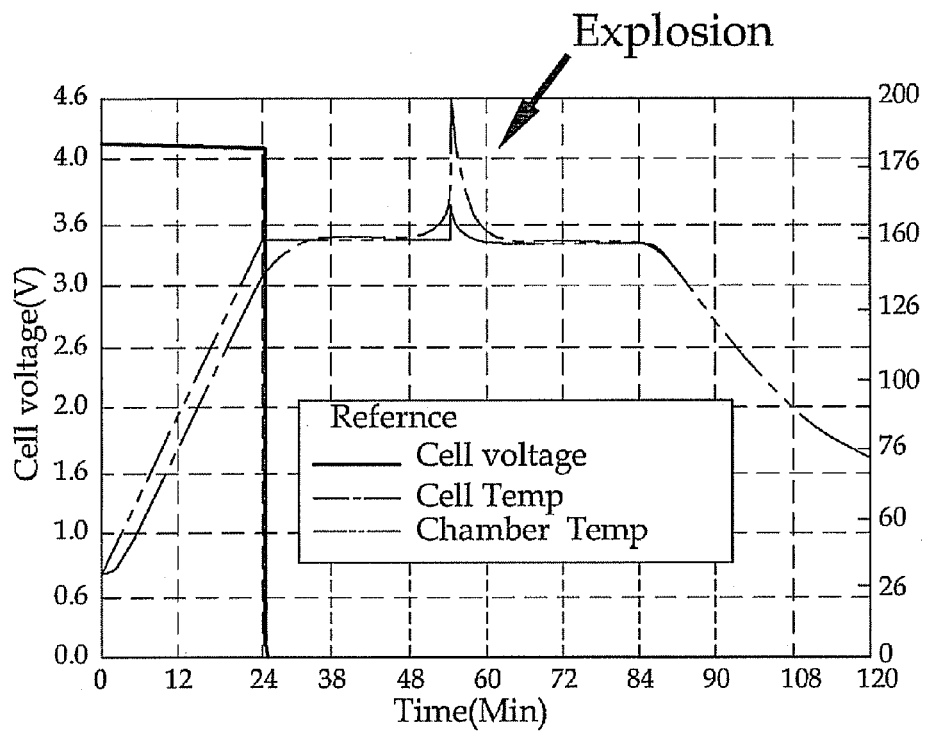
FIG. 9 is a graph showing the hot box (150° C.) test results of the batteries according to Example 1 and Comparative Example 1.
Figure 9:
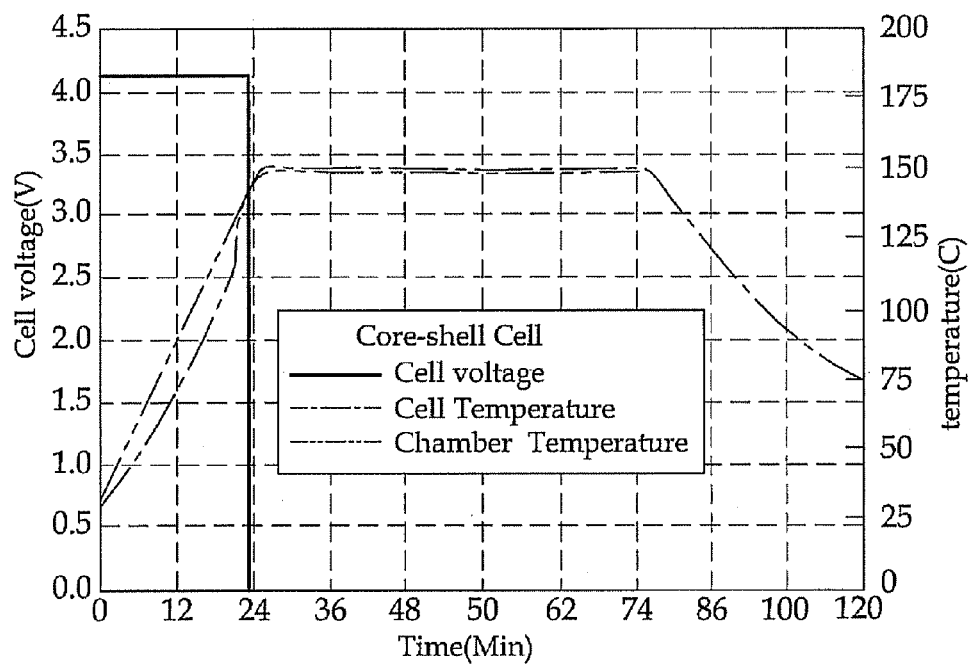

After the test, the battery according to Comparative Example 1 showed a slight delay in the CID operation after the heating, and exploded 23 minutes after it was heated (see FIG. 9a).

On the contrary, the lithium secondary battery according to the present invention showed excellent safety, even after 1 hour from the heating (see Table 2 and FIG. 9b). It is thought that a large amount of carbon dioxide is discharged from the core (gas discharge material) so that the concentration of the inflammable gases inside the battery is controlled to be less than the lower explosive limit.

TABLE 2

|  | CID operation time/ Battery temperature (° C.) | Event generation (Event generation time after the heating) |
|---|---|---|
| Ex. 2 | 10 min./128° C. | Event X/ No event even after 1 hour from the heating |
| Comp. Ex. 1 | 13 min./134° C. | Event O/ Explosion 23 minutes after the heating |

INDUSTRIAL APPLICABILITY

As can be seen from the foregoing, the electrochemical device comprising a gas discharge member with a core-shell structure, which discharges a large amount of gas in an abnormal operation temperature range, in the inner volumes thereof according to the present invention has significantly improved safety as compared to a conventional lithium secondary battery.

Although several preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An electrochemical device including a gas discharge member disposed in an interior thereof or used as an element for forming the device, wherein the gas discharge member comprises:
   (a) a core portion containing a compound that discharges gases other than oxygen at a predetermined temperature range; and
   (b) a polymeric shell portion for encapsulating the compound and surrounding the core portion.

2. The electrochemical device as claimed in claim 1, wherein the gas discharge member discharges a compound that generates gases to the exterior of the polymeric shell in a temperature range higher than a normal drive temperature of the device or a voltage range higher than 4.3V, or discharges gases under such conditions.

3. The electrochemical device as claimed in claim 1, wherein the polymer has a glass transition temperature ($T_g$) or a melting temperature ($T_m$) of 60~200° C.

4. The electrochemical device as claimed in claim 1, wherein the polymer is a polymer or copolymer polymerized by using at least one monomer selected from the group consisting of (meth)acrylate compounds, (meth)acrylonitrile compounds, (meth)acrylic acid compounds, (meth)acrylamide compounds, styrene compounds, vinylidene chloride, halogenated vinyl compounds, butadiene compounds, ethylene compounds, acetaldehyde and formaldehyde.

5. The electrochemical device as claimed in claim 1, wherein the compound that discharges gases other than oxygen at a predetermined temperature is selected from the group consisting of azo compounds, organic peroxides, hydrazide compounds, carbazide compounds, carbonate compounds and peroxide compounds.

6. The electrochemical device as claimed in claim 1, wherein the gas discharge member discharges the gas at a temperature of 60~200° C.

7. The electrochemical device as claimed in claim 1, wherein the gas discharged from the gas discharge member is selected from the group consisting of inert gases, fire extinguishing gases and inflammable gases.

8. The electrochemical device as claimed in claim 1, wherein the inert gas is selected from the group consisting of $N_2$, He, Ne, Ar, Kr and Xe; the fire extinguishing gas is selected from the group consisting of $CO_2$, $F_2$, $Cl_2$ and $Br_2$; and the inflammable gas is selected from the group consisting of propane, hydrogen, propylene, carbon monoxide, methane, ethane and ethylene.

9. The electrochemical device as claimed in claim 1, wherein the interior is a space in which no electrochemical reaction occurs, and is selected from the group consisting of the inner part of a mandrel, inner part of a center pin, and the top and bottom of the inner part of a casing.

10. The electrochemical device as claimed in claim 1, wherein the gas discharge member is present in an amount of 10~80% based on 100 vol% of the interior of the device.

11. The electrochemical device as claimed in claim 1, wherein constitutional elements in the device are interrupted from coming in contact with oxygen due to the gas other than oxygen, generated from the gas discharge member in a temperature range higher than the normal drive temperature of the device.

12. The electrochemical device as claimed in claim 1, wherein concentration of inflammable gases or combustion-aid gases present or generated in the device is controlled to be out of the explosive limit by the gas generated from the gas discharge member in a temperature range higher than the normal drive temperature of the device.

13. The electrochemical device as claimed in claim 1, which further comprises:
   (i) a first safety device that detects variations in the pressure inside the electrochemical device to interrupt charging of the electrochemical device or to convert a charging condition into a discharging condition;

(ii) a second safety device that detects variations in the pressure inside the electrochemical device to emit the heat or gas accumulated in the electrochemical device to the exterior; or (iii) both the first safety device and the second safety device.

14. The electrochemical device as claimed in claim 13, wherein the first safety device is a pressure-sensitive device.

15. The electrochemical device as claimed in claim 13, wherein the first safety device comprises:

(i) a pressure-sensitive member;

(ii) an electric wire for conducting current transferred from the pressure-sensitive member; and (iii) a member that responds to the current conducted from the electric wire part to interrupt charging of the electrochemical device or to convert a charging condition into a discharging condition.

16. The electrochemical device as claimed in claim 13, wherein the second safety device is a pressure regulating valve.

17. The electrochemical device as claimed in claim 13, wherein the first safety device, the second safety device or both are operated by a volumetric expansion or an increase in the internal pressure caused by a gas emission pressure of the gas discharged from the polymer in a temperature range higher than the normal drive temperature of the device.

18. The electrochemical device as claimed in claim 1, which is a lithium secondary battery.

* * * * *